US012799961B2

(12) United States Patent
Ohashi et al.

(10) Patent No.: US 12,799,961 B2
(45) Date of Patent: Nov. 17, 2026

(54) STUD BOLT FIXTURE

(71) Applicant: DAIWA KASEI INDUSTRY CO., LTD., Okazaki (JP)

(72) Inventors: Kenji Ohashi, Okazaki (JP); Hideyuki Kawaguchi, Okazaki (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 361 days.

(21) Appl. No.: 18/526,074

(22) Filed: Dec. 1, 2023

(65) Prior Publication Data

US 2024/0218893 A1 Jul. 4, 2024

(30) Foreign Application Priority Data

Dec. 28, 2022 (JP) ................................. 2022-211478

(51) Int. Cl.
*F16B 5/02* (2006.01)

(52) U.S. Cl.
CPC .......... *F16B 5/0241* (2013.01); *F16B 5/0258* (2013.01)

(58) Field of Classification Search
CPC .... F16B 5/0241; F16B 37/04; F16B 37/0842; F16B 37/0857; F16B 5/0258
USPC ...................... 411/433, 511, 512; 292/307 R
See application file for complete search history.

(56) References Cited

U.S. PATENT DOCUMENTS 5,660,513 A * 8/1997 Shibanushi ......... F16B 37/0842 411/908
6,070,836 A * 6/2000 Battie ..................... F16L 3/223 248/68.1
6,764,050 B2 * 7/2004 Takenaga ................. H02G 3/32 248/71
6,883,762 B2 * 4/2005 Miura ..................... F16L 3/223 248/62
7,008,160 B2 * 3/2006 Kanie ..................... F16L 3/223 411/433
(Continued)

FOREIGN PATENT DOCUMENTS

JP 9-32834 A 2/1997
JP 11-82455 A 3/1999
(Continued)

OTHER PUBLICATIONS

Japanese language office action dated Jun. 25, 2026, issued in application No. JP 2022-211478 (English language translation, pp. 1-4 of attachment).

*Primary Examiner* — Nicholas L Foster
(74) *Attorney, Agent, or Firm* — McClure, Qualey & Rodack, LLP

(57) ABSTRACT

Vibration suppression pieces are provided at the same positions as elastic engagement pieces around an axis of the stud bolt so as to sandwich the stud bolt inserted into a body part, and each include a pressing surface. In an insertion and fixation state where the stud bolt is inserted into the body part, each vibration suppression piece is pushed out toward an outer peripheral side by the stud bolt to become elastically deformed such that the vibration suppression piece is displaced from an inner peripheral side toward the outer peripheral side to a greater extent than the elastic engagement piece. Accordingly, the pressing surface presses the stud bolt toward the inner peripheral side more strongly than the elastic engagement piece.

5 Claims, 5 Drawing Sheets

(56) References Cited

U.S. PATENT DOCUMENTS

| | | | | |
|---|---|---|---|---|
| 7,802,761 | B2 * | 9/2010 | Volchko | F16L 55/035 248/68.1 |
| 7,891,151 | B2 | 2/2011 | Sano | |
| 7,926,767 | B2 * | 4/2011 | Saltenberger | F16L 3/2334 24/17 AP |
| 8,328,488 | B2 * | 12/2012 | Luk | F16B 37/0857 248/68.1 |
| 8,684,321 | B2 * | 4/2014 | Shirakabe | F16L 3/2235 24/297 |
| 8,899,894 | B2 * | 12/2014 | Limpert | F16B 37/043 411/433 |
| 8,979,461 | B2 * | 3/2015 | Pearson | F16L 3/237 24/297 |
| D747,246 | S * | 1/2016 | Ohashi | D12/190 |
| 9,284,967 | B2 * | 3/2016 | Iwahara | F16B 37/0857 |
| 9,284,974 | B2 * | 3/2016 | Iwahara | F16B 37/0857 |
| D795,769 | S * | 8/2017 | Ohashi | D12/190 |
| D795,770 | S * | 8/2017 | Ohashi | D12/190 |
| 10,414,443 | B2 * | 9/2019 | Arima | F16B 2/22 |
| 11,486,422 | B2 * | 11/2022 | Bell | F16B 21/073 |
| 2003/0075647 | A1 * | 4/2003 | Takenaga | B60R 16/0215 248/71 |
| 2004/0065785 | A1 * | 4/2004 | Miura | F16L 3/223 248/62 |
| 2004/0141828 | A1 * | 7/2004 | Kanie | F16L 3/223 411/437 |
| 2009/0028668 | A1 * | 1/2009 | Luk | F16B 5/0685 411/511 |
| 2009/0113675 | A1 * | 5/2009 | Saltenberger | F16L 3/2334 24/16 PB |
| 2009/0166489 | A1 * | 7/2009 | Volchko | F16L 3/223 248/74.1 |
| 2012/0014767 | A1 * | 1/2012 | Pearson | F16B 37/0842 411/511 |
| 2013/0009020 | A1 * | 1/2013 | Shirakabe | F16L 55/035 248/74.1 |
| 2013/0028681 | A1 * | 1/2013 | Limpert | F16B 37/0857 411/108 |
| 2014/0321936 | A1 * | 10/2014 | Iwahara | F16B 39/28 411/103 |
| 2014/0321940 | A1 * | 10/2014 | Iwahara | F16B 37/0857 411/174 |
| 2020/0309171 | A1 * | 10/2020 | Bell | F16B 21/073 |
| 2024/0123921 | A1 * | 4/2024 | Iwahara | F16B 2/08 |
| 2024/0263656 | A1 * | 8/2024 | Yamao | F16B 37/08 |

FOREIGN PATENT DOCUMENTS

| | | | |
|---|---|---|---|
| JP | 11-93932 | A | 4/1999 |
| JP | 2000516694 | A | 12/2000 |
| JP | 2007-292146 | A | 11/2007 |
| JP | 2009-257380 | A | 11/2009 |
| JP | 2017-187046 | A | 10/2017 |

* cited by examiner

STUD BOLT FIXTURE

RELATED APPLICATIONS

This application claims the priority of Japanese Patent Application No. 2022-211478 filed on Dec. 28, 2022. The disclosure of the prior application is hereby incorporated herein in the entirety by reference.

BACKGROUND OF THE INVENTION

Field of the Invention

This invention relates to a stud bolt fixture inserted and fixed to a stud bolt that is erected on an automobile body panel or the like.

Description of Related Art

A conventional stud bolt fixture includes a body part into which a stud bolt having a predetermined bolt diameter (thread diameter) is inserted, and a plurality of elastic engagement pieces which extend from the inside of the body part so as to sandwich the inserted stud bolt and each of which engages the thread of the stud bolt (e.g., Japanese Laid-Open Patent Publication No. 2007-292146). The stud bolt inserted into the body part advances in the body part while bending each elastic engagement piece toward the outer peripheral side, and is fixed by being engaged by an engagement claw of each elastic engagement piece at a predetermined position.

Meanwhile, in the body part of the stud bolt fixture, an entrance portion in the insertion direction of the stud bolt is formed so as to have an insertion hole having a diameter corresponding to the bolt diameter of the stud bolt. In this case, when the stud bolt is subjected to vibration due to vehicle running vibration or the like in a state where the stud bolt is inserted and fixed to the stud bolt fixture, the stud bolt vibrates so as to oscillate on the far side with the entrance portion of the stud bolt fixture as a fulcrum. As a result, each elastic engagement piece of the stud bolt fixture is pushed out by the oscillation to become elastically deformed. That is, each elastic engagement piece and the engagement claw at the distal end thereof receive the load corresponding to the oscillation of the stud bolt. The conventional stud bolt fixture is molded from a resin material having certain rigidity or higher, thereby resisting the load received by each elastic engagement piece and each engagement claw.

However, for such a stud bolt fixture, due to the demand for a decrease in cost and addition of other functions, there is a need to increase the options of resin material used for molding the stud bolt fixture. Therefore, even if the stud bolt fixture is made less rigid by changing the resin material, it is necessary to be able to resist the load received by each elastic engagement piece and each engagement claw by another method.

An object of this invention is to provide a stud bolt fixture that can suppress vibration (oscillation) of a stud bolt that is inserted and fixed thereto and that has a predetermined bolt diameter, more than in the conventional art.

SUMMARY OF THE INVENTION

A stud bolt fixture for attaining the aforementioned object is a stud bolt fixture to which a stud bolt having a predetermined bolt diameter (thread diameter) is inserted and fixed, the stud bolt fixture including:

a body part formed as an insertion part for the stud bolt and formed such that an entrance portion thereof is close to a thread crest of the inserted stud bolt;

a plurality of elastically deformable elastic engagement pieces provided around an axis of the stud bolt so as to sandwich the stud bolt inserted into the body part, and each including an elastic arm projecting inwardly from an inner wall surface of the body part on a far side with respect to the entrance portion, and an engagement claw for engaging a thread of the stud bolt at a distal end thereof; and elastically deformable vibration suppression pieces provided at the same positions as the elastic engagement pieces around the axis of the stud bolt so as to sandwich the stud bolt inserted into the body part, and each including an elastic arm projecting inwardly from the inner wall surface on the far side with respect to the elastic engagement piece, and a pressing surface for pressing the thread of the stud bolt at a distal end thereof, wherein the pressing surface includes an inner-peripheral-side distal end surface located on an inner peripheral side of the body part with respect to the engagement claw, and in an insertion and fixation state where the stud bolt is inserted into the body part and engaged by the engagement claws, each vibration suppression piece is pushed out toward an outer peripheral side by the thread of the stud bolt to become elastically deformed such that the vibration suppression piece is displaced from the inner peripheral side toward the outer peripheral side to a greater extent than the elastic engagement piece, whereby the pressing surface presses the stud bolt toward the inner peripheral side more strongly than the elastic engagement piece.

In the above-described configuration, each vibration suppression piece which bulges on the inner peripheral side with respect to the elastic engagement piece in a natural state (non-elastic-deformation state) becomes elastically deformed to a great extent toward the outer peripheral side by the inserted stud bolt, and presses the stud bolt toward the inner peripheral side so as to forcefully sandwich the stud bolt by an elastic restoring force corresponding to the amount of elastic deformation of the vibration suppression piece, whereby vibration (oscillation) of the stud bolt can be suppressed. In addition, the vibration (oscillation) of the stud bolt occurs to a greater extent on the far side in the insertion direction with an insertion entrance portion of the stud bolt fixture (body part) as a fulcrum, but the vibration (oscillation) of the stud bolt is effectively suppressed due to the presence of the vibration suppression pieces on the far side in the insertion direction, so that the vibration (oscillation) received by each elastic engagement piece existing on the near side of the vibration suppression piece can be greatly reduced, and the elastic engagement piece can be protected.

The body part may include a deformation restriction portion which comes into contact with the vibration suppression pieces to prevent further elastic deformation of the vibration suppression pieces toward the outer peripheral side when the vibration suppression pieces become elastically deformed toward the outer peripheral side. In this configuration, the deformation restriction portion limits the movable range of the vibration suppression piece, so that damage to the vibration suppression piece can be prevented when the amplitude of the vibrating stud bolt is large.

A distal end portion of each vibration suppression piece on which the pressing surface is formed may include, as seen in the axial direction of the inserted stud bolt, a first extension portion which comes into contact with the thread of the stud bolt and extends tangentially to a contact point thereof, and a second extension portion which bends from one end side of the first extension portion and extends toward the stud bolt side, which comes into contact with the thread of the stud bolt at a first extension portion-side wall surface on an extending distal end side thereof, and which is shorter than the first extension portion. With this configuration, when the pressing surface of each vibration suppression piece presses the stud bolt, the contact area of the pressing surface increases, so that the vibration (oscillation) of the stud bolt can be effectively suppressed.

The pressing surface can be a flat or curved surface not having a claw shape projecting in an acute shape with respect to the inserted stud bolt. When the pressing surface is provided with a claw shape like the engagement claw of the elastic engagement piece, the claw shape enters the thread groove of the stud bolt, the amount of elastic deformation of the vibration suppression piece is reduced, and the pressing force for suppressing the vibration (oscillation) of the stud bolt is reduced. Since the pressing surface is not provided with a claw shape as described above, when the pressing surface of each vibration suppression piece presses the stud bolt, the vibration suppression piece becomes elastically deformed to a greater extent such that the pressing surface comes into contact with the thread crest of the stud bolt, so that the pressing force to the stud bolt increases, and the vibration (oscillation) of the stud bolt can be effectively suppressed.

The pressing surface can be formed such that the pressing surface includes an entrance-side inclined distal end surface which forms a slope gradually approaching the inserted stud bolt from the entrance side toward the far side in the insertion direction, and a far-side distal end surface (far-side flat surface) which bends on the far side of the entrance-side inclined distal end surface and further extends toward the far side in the insertion direction (in a straight manner), and such that at least the far side of the entrance-side inclined distal end surface is closer to the inserted stud bolt than the claw distal end position of the engagement claw is. In the above-described configuration, the entrance-side inclined distal end surface of the pressing surface can be used as a guide surface when the stud bolt is inserted. In addition, since the far-side distal end surface (far-side flat surface) is formed, the distal end of the vibration suppression piece extends toward the far side in the insertion direction and approaches the deformation restriction portion of the body part described above, so that the deformation of the vibration suppression piece is easily restricted.

DETAILED DESCRIPTION

Hereinafter, an embodiment of this invention will be described with reference to the drawings.

Figure 1:
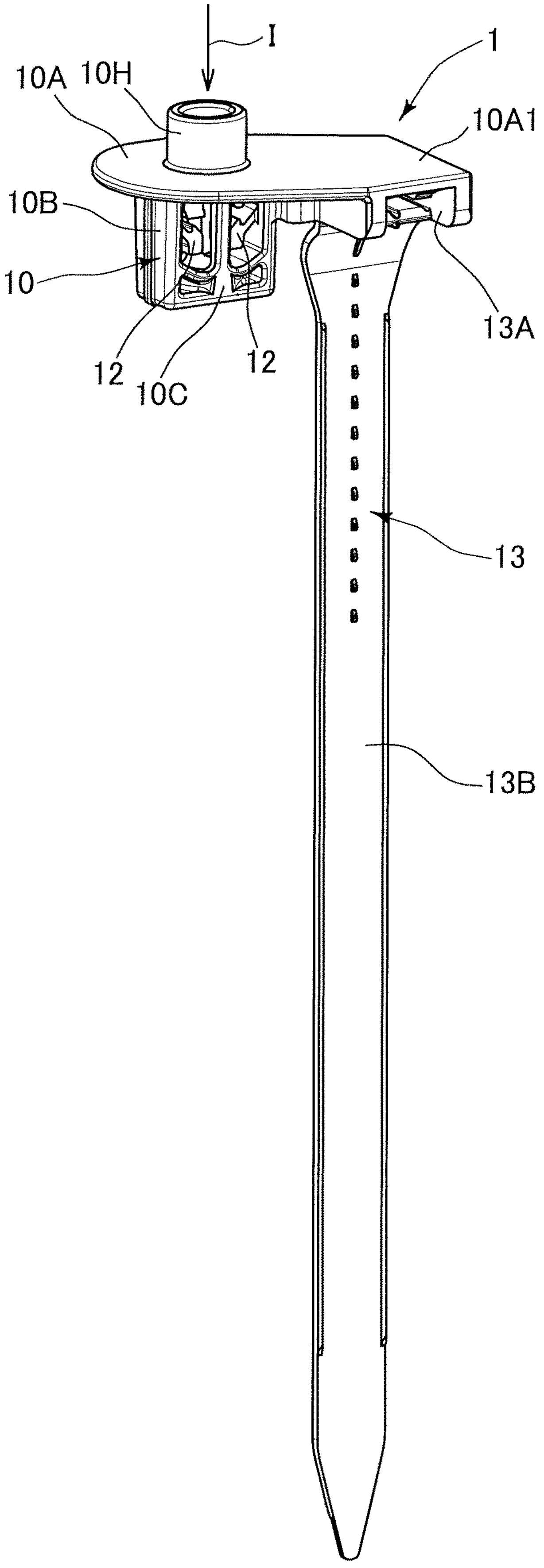
FIG. 1 is a perspective view showing a stud bolt fixture according to an embodiment of this invention.
Figure 2:
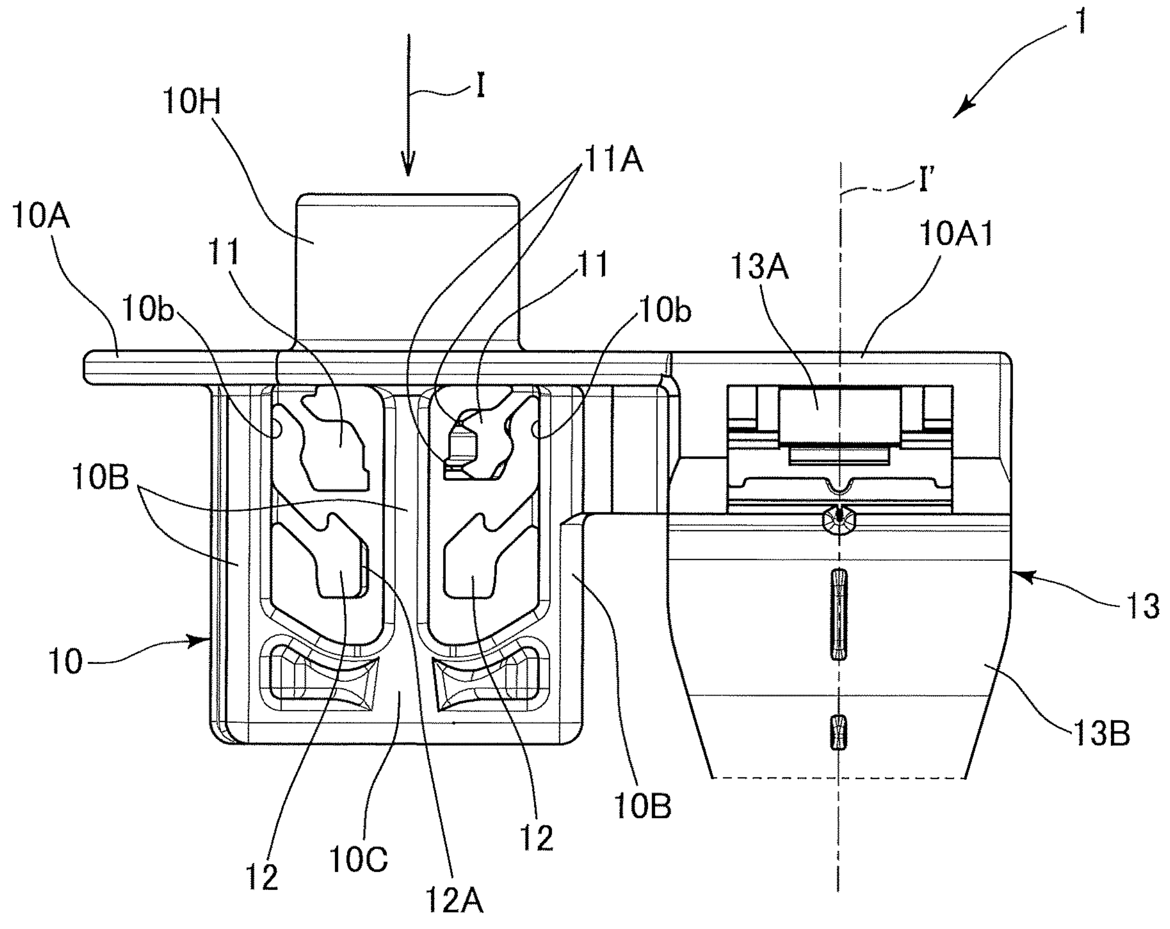
FIG. 2 is an enlarged front view showing an upper part of FIG. 1.
Figure 4:
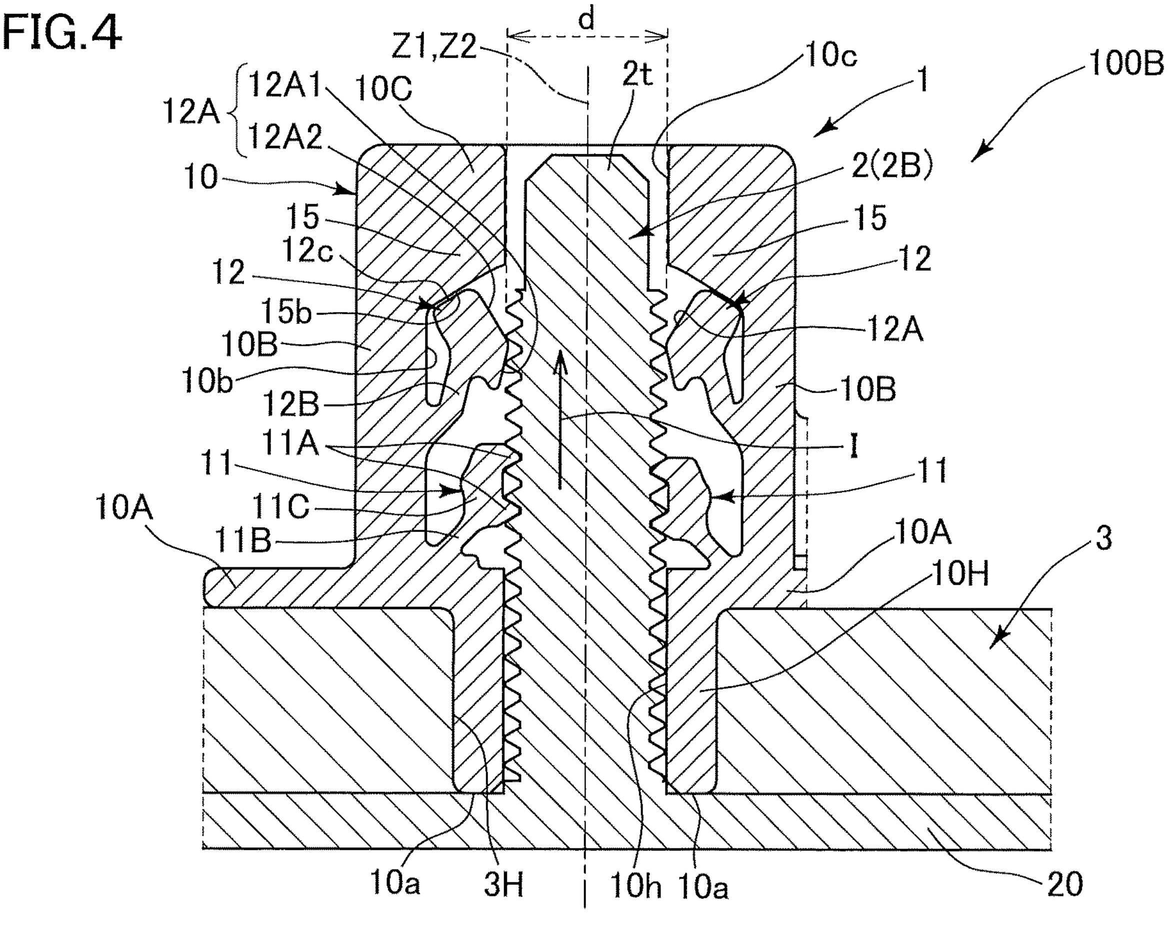
FIG. 4 is a cross-sectional view showing a state where a stud bolt is inserted and fixed to the body part in FIG. 3.

As shown in FIG. 1 and FIG. 2, a stud bolt fixture 1 according to this embodiment is a resin molded article integrally including a body part 10, elastic engagement pieces 11, vibration suppression pieces 12, and a functional part 13. As shown in FIG. 4, a stud bolt 2 having a predetermined bolt diameter d (thread diameter) is inserted and fixed to the stud bolt fixture 1.

Figure 3:
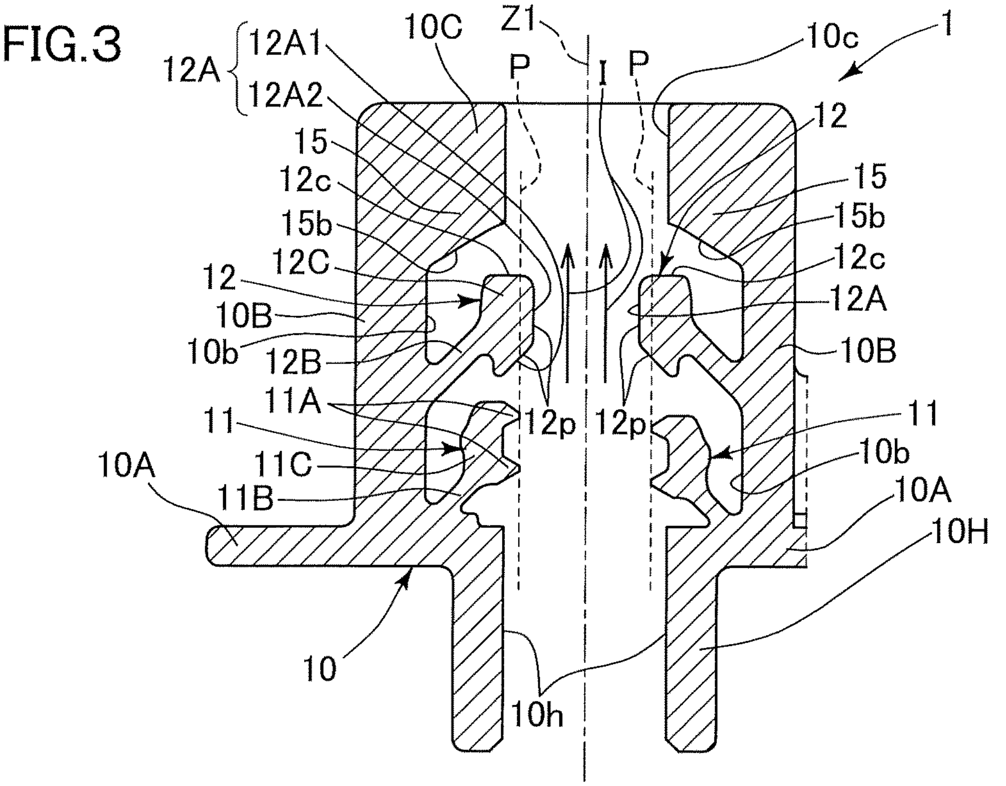
FIG. 3 is a cross-sectional view of a body part on the left side of FIG. 2.

FIG. 3 and FIG. 4 show cross-sections of the stud bolt fixture 1 when the stud bolt 2 is not inserted thereinto and when the stud bolt 2 is inserted and fixed thereto. Both cut planes are identical, and pass through an axis Z1 of the body part 10 and first extension portions 11C1 and 12C1 (see FIG. 5 and FIG. 6) of the elastic engagement pieces 11 and the vibration suppression pieces 12 described later. Cross-sectional views in FIG. 7 and FIG. 8 described later are also the same as in FIG. 3 and FIG. 4.

As shown in FIG. 4, the stud bolt 2 has a spiral thread formed on the outer periphery thereof at a predetermined pitch from a distal end side thereof toward a proximal end side thereof, and projects from a panel material 20 in a straight manner. Here, the stud bolt 2 and the panel material 20 form a single metal component, but a stud bolt 2 and a panel material 20 which are separate components may be assembled together. The stud bolt 2 has the predetermined bolt diameter d, and, as the stud bolt 2, there are at least two types of stud bolts: a first stud bolt having a thread having the bolt diameter d and formed up to a distal end thereof; and a second stud bolt including a distal end portion 2*t* having a cylindrical shape on which no thread is formed. Here, a second stud bolt 2B including a distal end portion 2*t* on which no thread is formed is used, and a fixing structure 100B in which the second stud bolt 2B is inserted and fixed to the stud bolt fixture 1 is formed.

The resin material for forming the stud bolt fixture 1 may be nylon which is used for conventional stud bolt fixtures, or a material having lower rigidity than nylon. Here, a resin material having lower rigidity than nylon is employed. Specifically, PP (polypropylene) and the like can be employed.

The body part 10 is formed as an insertion part for the stud bolt 2. As shown in FIG. 1 and FIG. 2, an insertion entrance portion 10H (entrance portion), for the stud bolt 2, of the body part 10 is formed in a tubular shape such that an inner peripheral surface 10*h* (see FIG. 3) is close to the thread crest of the inserted stud bolt 2 (see FIG. 1). In the body part 10, the insertion entrance portion 10H has a flange portion 10A formed on the far side thereof so as to extend in a direction orthogonal to an axis Z2 (insertion direction I) of the inserted stud bolt 2. The axis Z1 is the axis of the body part 10, and the stud bolt 2 is inserted such that the axis Z2 thereof coincides with the axis Z1 (see FIG. 4).

As shown in FIG. 4, a sheet material 3 such as a silencing material is placed on the flange portion 10A (below the flange portion 10A in FIG. 4). The tubular insertion entrance portion 10H is inserted into a through hole 3H provided in the sheet material 3. The stud bolt 2 which projects from the panel material 20 is inserted through the insertion entrance portion 10H, and the panel material 20 comes into contact with an entrance surface 10*a* of the insertion entrance portion 10H. The sheet material 3 is interposed between the flange portion 10A and the panel material 20.

As shown in FIG. 1 and FIG. 2, the body part 10 has an insertion body portion 10B formed on the far side of the insertion entrance portion 10H. Here, the insertion body portion 10B is formed as a plurality of outer peripheral column portions placed so as to surround the outer periphery of the inserted stud bolt 2 and extending along the axis Z2 (insertion direction I) of the stud bolt 2, and an insertion space is formed on the inner peripheral side of the outer peripheral column portions so as to be wider than the insertion entrance portion 10H (see FIG. 3). Each outer peripheral column portion (10B) is provided so as to project from a surface on the far side in the insertion direction I of the flange portion 10A.

Figure 5:
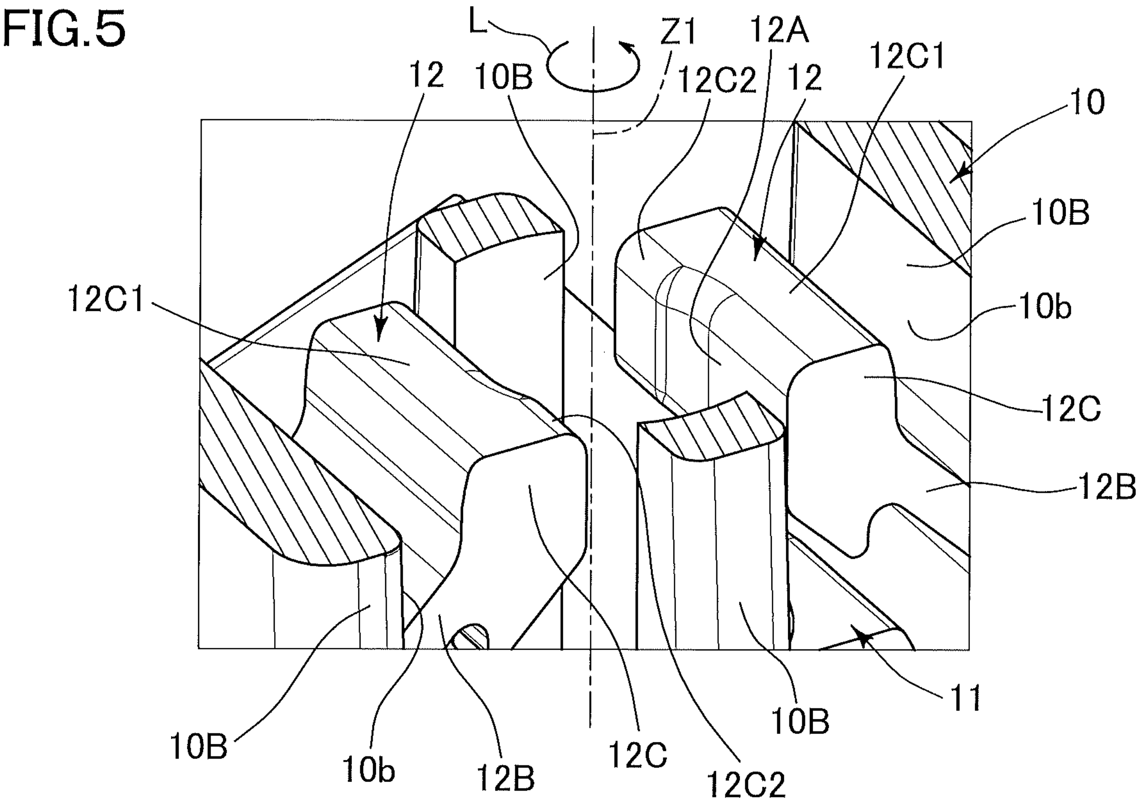
FIG. 5 is a perspective cross-sectional view of the body part in FIG. 3 in which vibration suppression pieces are seen.
Figure 6:
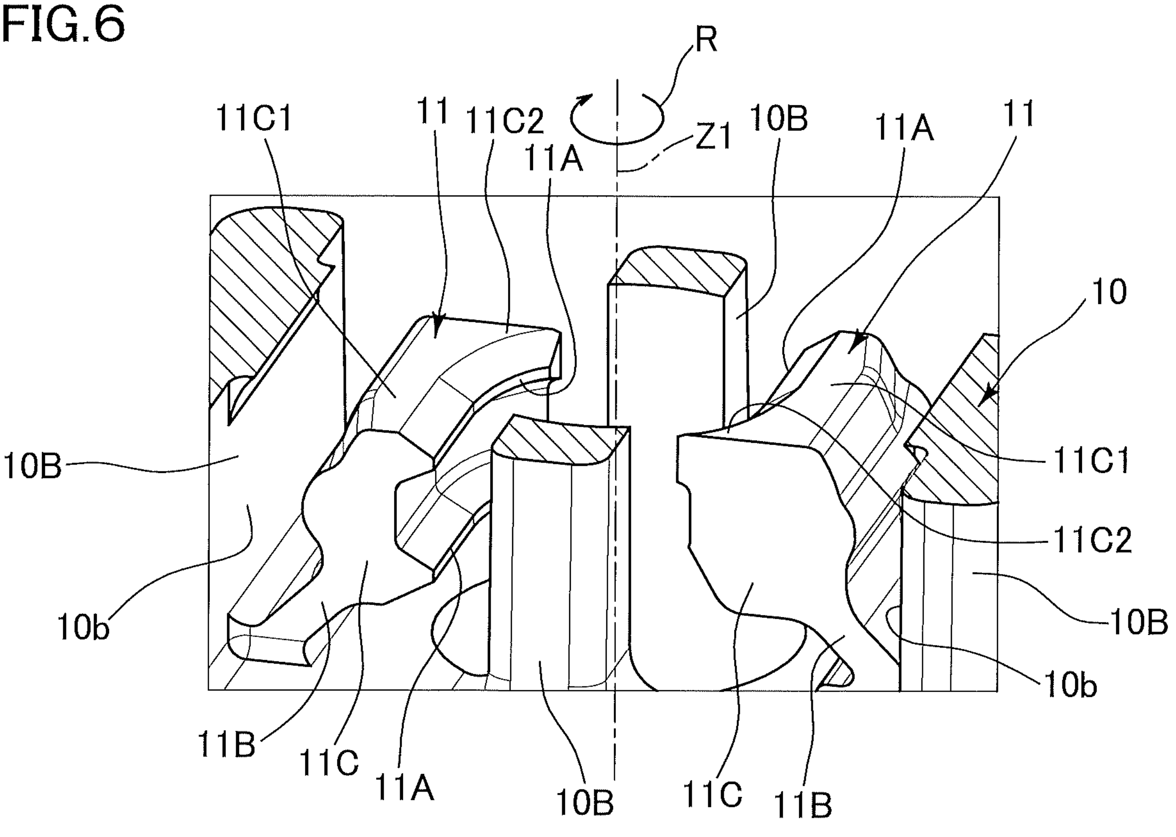
FIG. 6 is a perspective cross-sectional view of the body part in FIG. 3 in which elastic engagement pieces are seen.

As shown in FIG. 5 and FIG. 6, the outer peripheral column portions 10B forming the insertion body portion 10B are four outer peripheral column portions formed in the circumferential direction around the axis Z1, one pair of outer peripheral column portions opposing each other, among these outer peripheral column portions, are guide column portions that have an opposing width corresponding to the diameter of the insertion entrance portion 10H and that guide the insertion of the stud bolt 2, and the other pair of outer peripheral column portions are column portions on which the elastic engagement pieces 11 and the vibration suppression pieces 12 described later are formed and which have an opposing width wider than the insertion entrance portion 10H.

In the body part 10, as shown in FIG. 3 and FIG. 4, an insertion far portion 10C for the stud bolt 2 has a through hole 10*c* formed so as to have a diameter corresponding to the bolt diameter d such that the stud bolt 2 having the predetermined bolt diameter d can penetrate therethrough. The stud bolt 2 is the second stud bolt 2B (see FIG. 4) including the distal end portion 2*t* on which no thread is formed, and the distal end portion 2*t* is inserted into the through hole 10*c* of the insertion far portion 10C. Since no thread is formed on the distal end portion 2*t*, there is a gap between an inner wall surface of the through hole 10*c* and the distal end portion 2*t*. Due to the presence of this gap, oscillation on the distal end portion 2*t* side can occur in the stud bolt 2B with the insertion entrance portion 10H side as a fulcrum. This oscillation is suppressed by the vibration suppression pieces 12 described later.

In this embodiment, the stud bolt 2 is inserted and fixed such that the distal end portion 2*t* is housed in the body part 10 and does not penetrate through the body part 10. However, in this invention, the stud bolt 2 may be inserted and fixed such that the stud bolt 2 penetrates through the insertion far portion 10C (through hole 10*c*).

The functional part 13 is provided as a holding part having a function of holding a longitudinal wire routing material (not shown). Specifically, as shown in FIG. 1 and FIG. 2, the flange portion 10A of the body part 10 is formed so as to extend in a disk shape, and has a flange extension portion 10A1 which is formed such that a surface on the near side in the insertion direction I thereof is a flat surface and which is extended in one direction in the extension direction (in-plane direction) of the flange portion 10A. The functional part 13 is formed on the far side in the insertion direction I of the extension portion 10A1.

The functional part 13 is a known binding part (belt clamp part, wire harness holding part) including: a belt portion 13B surrounding the outer periphery of a longitudinal wire routing material (e.g., wire harness); and a buckle portion 13A capable of receiving and fixing the belt portion 13B from a distal end side of the belt portion 13B. The buckle portion 13A is formed on the far side in the insertion direction I of the flange extension portion 10A1, and the belt portion 13B extends from a belt exit side, opposite to a belt entrance side of the buckle portion 13A, toward the far side in the insertion direction I. The buckle portion 13A is shaped so as to receive the belt portion 13B in a direction orthogonal to an axis I' (see FIG. 2) parallel to the insertion direction I.

The functional part 13 may be a functional part different from that of this embodiment.

As shown in FIG. 3, FIG. 4, and FIG. 6, a plurality of (here two) elastic engagement pieces 11 are provided around the axis Z1 (around the axis Z2 of the stud bolt 2) so as to sandwich the stud bolt 2, inserted into the body part 10, from the outer peripheral side. Each elastic engagement piece 11 includes an elastic arm 11B projecting inwardly from an inner wall surface 10*b* (see FIG. 3) of the insertion body portion 10B (outer peripheral column portion) on the far side (far side in the insertion direction I of the stud bolt 2) with respect to the insertion entrance portion 10H of the body part 10, and an engagement claw 11A for engaging an outer peripheral portion of the stud bolt 2 at a distal end thereof. The elastic arm 11B is elastically deformable, with a connection portion between the inner wall surface 10*b* and the elastic arm 11B as a fulcrum, so as to oscillate in the insertion direction I (up-down direction in FIG. 3) on a distal end portion 11C side on which the engagement claw 11A is provided, and the distal end portion 11C side is pushed out by the inserted stud bolt 2 toward the far side in the insertion direction I and the outer peripheral side (FIG. 3→FIG. 4).

The elastic arm 11B extends in a straight manner toward the axis Z2 of the inserted stud bolt 2 so as to be inclined toward the insertion direction I side. An elastic engagement piece distal end portion 11C (distal end portion 11C side of the elastic engagement piece 11) is formed at the distal end of the elastic arm 11B so as to extend in the insertion direction I (upward in FIG. 3), and the engagement claw 11A is provided on a surface, facing the axis Z2, of the elastic arm 11B. The engagement claw 11A has a claw shape in which the engagement claw 11A projects in an acute shape toward the inserted stud bolt 2 such that the engagement claw 11A can enter the thread groove of the stud bolt 2. On the elastic engagement piece distal end portion 11C, two engagement claws 11A are provided so as to be aligned in the insertion direction I of the stud bolt 2.

As shown in FIG. 3, FIG. 4, and FIG. 5, the vibration suppression pieces 12 are provided at the same positions (same phases) as the elastic engagement pieces 11 around the axis Z1 (around the axis Z2 of the stud bolt 2) so as to sandwich the stud bolt 2, inserted into the body part 10, from the outer peripheral side. Each vibration suppression piece 12 includes an elastic arm 12B projecting inwardly from the inner wall surface 10*b* (see FIG. 3) on the far side (far side in the insertion direction I) with respect to each elastic engagement piece 11, and a pressing surface 12A for pressing the outer peripheral portion of the stud bolt 2 at a distal end thereof. The elastic arm 12B is elastically deformable, with a connection portion between the inner wall surface 10*b* and the elastic arm 12B as a fulcrum, so as to oscillate in the insertion direction I (up-down direction in FIG. 3) on a distal end portion 12C side on which the pressing surface 12A is provided, and the distal end portion 12C side is pushed out by the inserted stud bolt 2 toward the far side in the insertion direction I and the outer peripheral side (FIG. 3→FIG. 4).

The elastic arm 12B extends in a straight manner toward the axis Z2 of the inserted stud bolt 2 so as to be inclined toward the insertion direction I side. A vibration suppression piece distal end portion 12C (distal end portion 12C side of the vibration suppression piece 12) is formed at the distal end of the elastic arm 12B so as to extend in the insertion direction I (upward in FIG. 3), and a distal end surface, facing the axis Z2, of the elastic arm 12B is the pressing surface 12A.

As shown in FIG. 3, each pressing surface 12A includes an inner-peripheral-side distal end surface 12*p* located on the inner peripheral side of the body part 10 with respect to the distal ends of the engagement claws 11A (the axis Z1 side with respect to a dashed line P in FIG. 3 (the distal end positions of the engagement claws 11A)) in a natural state (non-elastic-deformation state) of the elastic engagement piece 11 and the vibration suppression piece 12. Therefore, in an insertion and fixation state where the stud bolt 2 is inserted to a predetermined position in the body part 10 and engaged by the engagement claws 11A, each vibration suppression piece 12 is pushed out by the inserted stud bolt 2 toward the outer peripheral side in the same manner as each elastic engagement piece 11, and each vibration suppression piece 12 is displaced (elastically deformed) from the inner peripheral side toward the outer peripheral side to a greater extent than the elastic engagement piece 11, since each pressing surface 12A includes the inner-peripheral-side distal end surface 12*p* on the inner peripheral side with respect to the elastic engagement piece 11 (engagement claws 11A). Due to this greater displacement (elastic deformation), each vibration suppression piece 12 comes into a state of having a larger elastic restoring force, and each pressing surface 12A presses the inserted stud bolt 2 toward the inner peripheral side more strongly than the elastic engagement piece 11.

The pressing by the pressing surface 12A can reduce oscillation displacement of the stud bolt 2 inserted into the body part 10 of the stud bolt fixture 1 (see FIG. 4). This oscillation displacement is displacement of the distal end portion 2*t* side (far side in the insertion direction I) of the stud bolt 2 toward the outer peripheral side with the insertion entrance portion 10H (entrance portion) side of the body part 10 as a fulcrum, which is caused by vehicle vibration (running vibration, etc.), etc., for example, in the stud bolt 2 inserted into the body part 10. Since the oscillation displacement is reduced, oscillation displacement (elastic deformation) of each elastic engagement piece 11 toward the outer peripheral side is also reduced. That is, the load received by the elastic engagement piece 11 and the engagement claws 11A thereof along with the oscillation of the stud bolt 2 when vehicle vibration occurs is reduced. Therefore, the elastic engagement piece 11 (the elastic arm 11B and the engagement claws 11A) is less likely to be damaged, so that the stud bolt fixture 1 can be formed from a resin material having lower rigidity than in the conventional art.

The elastic engagement pieces 11 and the vibration suppression pieces 12 are present at the same positions (same phases) around the axis Z1 of the body part 10 (around the axis Z2 of the stud bolt 2 inserted into the body part 10). That is, each elastic engagement piece 11 and each vibration suppression piece 12 are formed inside the body part 10 so as to be aligned in the direction of the axis Z1 of the body part 10 (the direction of the axis Z2 of the stud bolt 2 inserted into the body part 10). Therefore, when any of the elastic engagement pieces 11 is elastically deformed due to the above oscillation displacement of the stud bolt 2 inserted into the body part 10, the vibration suppression piece 12 that is aligned directly above the elastic engagement piece 11 in the direction of the axis Z1 (axis direction Z1) can reliably suppress the elastic deformation of the elastic engagement piece 11 and protect the elastic engagement piece 11.

As shown in FIG. 4, the body part 10 also includes a deformation restriction portion 15 which comes into contact with the vibration suppression pieces 12 to prevent further elastic deformation of the vibration suppression pieces 12 toward the outer peripheral side when the vibration suppression pieces 12 are displaced in an oscillating manner (elastically deformed) toward the outer peripheral side. Accordingly, the vibration suppression pieces 12 can be prevented from being damaged due to excessive deformation. Here, the inner wall surface 10*b* on the far side (far side in the insertion direction I of the stud bolt 2) with respect to the insertion entrance portion 10H of the body part 10 is formed as an inclined surface 15*b* protruding toward the inner peripheral side as coming closer to the far side, on the far side with respect to the position where each vibration suppression piece 12 and the inner wall surface 10*b* are connected to each other, and the deformation restriction portion 15 has the inclined surface 15*b* as a deformation restriction surface 15*b* which comes into contact with the vibration suppression pieces 12.

As shown in FIG. 3, each vibration suppression piece 12 has a contact surface 12*c* (vibration suppression piece-side contact surface) which faces the deformation restriction surface 15*b* in a natural state (non-elastic-deformation state) and which comes into contact with the deformation restriction surface 15*b* when being displaced in an oscillating manner (elastically deformed) to a great extent toward the outer peripheral side. The contact surface 12*c* is formed in a shape corresponding to the deformation restriction surface 15*b* such that the contact surface 12*c* is in surface contact with the deformation restriction surface 15*b* when the contact surface 12*c* comes into contact with the deformation restriction surface 15*b*. The deformation restriction surface 15*b* is a flat surface inclined with respect to the axis Z1 and not having protrusions and the like, and the contact surface 12*c* is also formed as a flat surface almost orthogonal to the axis Z1 and not having protrusions and the like.

In this embodiment, as shown in FIG. 5, the distal end portion 12C (vibration suppression piece distal end portion) of each vibration suppression piece 12 on which the pressing surface 12A is formed has an approximately L-shape including a first extension portion 12C1 which extends tangentially to the stud bolt 2, and a second extension portion 12C2 which bends from one end side of the first extension portion 12C1 and extends toward the stud bolt 2 side and which is shorter than the first extension portion 12C1, as seen in an axis Z2 direction (coinciding with the axis Z1 direction) of the inserted stud bolt 2. Accordingly, the pressing surface 12A comes into contact with the thread of the stud bolt 2 inserted into the body part 10, at least at two points in the circumferential direction of the thread, that is, the first extension portion 12C1 and the second extension portion 12C2, and thus can stably press the stud bolt 2.

Similarly, as shown in FIG. 6, the distal end portion 11C (elastic engagement piece distal end portion) of each elastic engagement piece 11 on which the engagement claws 11A are formed has an approximately L-shape including a first extension portion 11C1 which extends tangentially to the stud bolt 2, and a second extension portion 11C2 which bends from one end side of the first extension portion 11C1 and extends toward the stud bolt 2 side and which is shorter than the first extension portion 12C1, as seen in the axis Z2 direction (coinciding with the axis Z1 direction) of the inserted stud bolt 2. Accordingly, each engagement claw 11A enters the thread groove of the stud bolt 2 inserted into the body part 10, at least at two points in the circumferential direction of the thread groove, that is, the first extension portion 11C1 and the second extension portion 11C2, and thus enables stable engagement.

Around the axis Z2 of the inserted stud bolt 2 (around the axis Z1), the second extension portion 12C2 side (left rotation side around the axis Z1 in FIG. 5: arrow L direction side), with respect to the first extension portion 12C1, of each vibration suppression piece 12 on which the pressing surface 12A is formed, is opposite to the second extension portion 11C2 side (right rotation side around the axis Z1 in FIG. 6: arrow R direction side), with respect to the first extension portion 11C1, of each elastic engagement piece 11 on which the engagement claws 11A are formed.

Furthermore, as shown in FIG. 5, each pressing surface 12A has a section curved along the outer peripheral edge (thread crest) of the stud bolt 2 from the first extension portion 12C1 to the second extension portion 12C2. Therefore, each pressing surface 12A is in contact for a longer distance (in line contact) with the thread of the stud bolt 2 inserted into the body part 10 in the circumferential direction (around the axis Z1) at the curved section thereof. Therefore, each vibration suppression piece 12 can stably and reliably receive the oscillation displacement of the inserted stud bolt 2 and can more effectively suppress the vibration (oscillation) of the stud bolt 2.

Similarly, as shown in FIG. 6, each engagement claw 11A has a section curved along the outer peripheral edge (thread crest) of the stud bolt 2 from the first extension portion 11C1 to the second extension portion 11C2. Therefore, each engagement claw 11A is in an engagement state where the engagement claw 11A enters the thread groove of the stud bolt 2 inserted into the body part 10, for a longer distance around the circumferential direction (around the axis Z2) at the curved section thereof. Therefore, each elastic engagement piece 11 stably and reliably engages with the inserted stud bolt 2 and holds the stud bolt 2 in a state where the stud bolt 2 is prevented from being pulled out.

As shown in FIG. 3 and FIG. 4, each pressing surface 12A is composed of a flat or curved surface (any of a flat surface, a curved surface, and a combination of a flat surface and a curved surface) not having a claw shape projecting in an acute shape toward the inserted stud bolt 2 (claw shape like the engagement claw 11A of the elastic engagement piece 11). Therefore, when the pressing surface 12A of each vibration suppression piece 12 presses the stud bolt 2, the pressing surface 12A comes into contact with the thread crest of the stud bolt 2 to elastically deform the vibration suppression piece 12 to a greater extent. As a result, the greater elastic deformation increases the pressing force to the stud bolt 2, so that the vibration (oscillation) of the stud bolt 2 can be more effectively suppressed. If each vibration suppression piece 12 has a claw shape like the engagement claw 11A of the elastic engagement piece 11, the claw-shaped portion thereof enters the thread groove of the stud bolt 2, so that the elastic deformation of the vibration suppression piece 12 is reduced.

As shown in FIG. 3, each pressing surface 12A includes an entrance-side inclined distal end surface 12A1 which forms a slope gradually approaching the inserted stud bolt 2 from the near side (entrance side) toward the far side in the insertion direction I, and a far-side distal end surface 12A2 which bends on the far side of the entrance-side inclined distal end surface 12A1 and further extends toward the far side in the insertion direction I. The above-described inner-peripheral-side distal end surface 12*p* (surface region, of the pressing surface 12A, existing on the axis Z1 side with respect to a straight line P in FIG. 3) is a smooth continuous surface including the far side in the insertion direction I of the entrance-side inclined distal end surface 12A1 and the entire far-side distal end surface 12A2. When the stud bolt 2 is inserted into the insertion body portion 10B, the far side in the insertion direction I of the entrance-side inclined distal end surface 12A1 is pressed and the vibration suppression piece 12 becomes elastically deformed. Therefore, the inner-peripheral-side distal end surface 12*p* may be at least only the far side in the insertion direction I of the entrance-side inclined distal end surface 12A1 and the near side in the insertion direction I of the far-side distal end surface 12A2 (i.e., only the connection portion between the entrance-side inclined distal end surface 12A1 and the far-side distal end surface 12A2), and even if the inner-peripheral-side distal end surface 12*p* is only the far side in the insertion direction I of the entrance-side inclined distal end surface 12A1 and the near side in the insertion direction I of the far-side distal end surface 12A2, the vibration suppression piece 12 can be elastically deformed when the stud bolt 2 is inserted.

The far-side distal end surface 12A2 forms a flat surface (far-side flat surface) extending along the insertion direction I of the stud bolt 2 when the vibration suppression piece 12 is in a natural state (non-elastic-deformation state: see FIG. 3). The contact surface 12*c* forms a flat surface almost orthogonal to the far-side distal end surface 12A2, and the area thereof is ensured. Accordingly, the contact surface 12*c* comes into surface contact with the deformation restriction portion 15 over a sufficiently large area.

Although one embodiment of this invention has been described above, this embodiment is merely illustrative, this invention is not limited thereto, and various modifications such as additions and omissions may be made on the basis of the knowledge of a person skilled in the art without departing from the scope of the claims.

Figure 7:
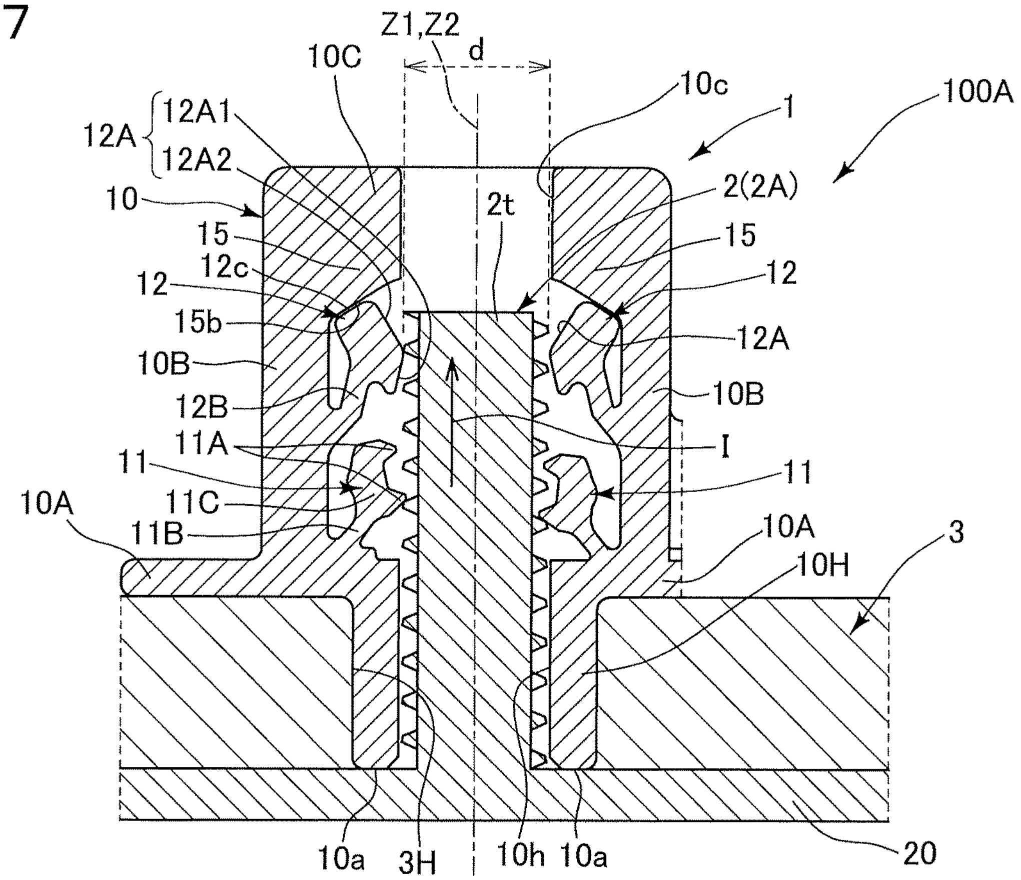
FIG. 7 is a cross-sectional view in which the stud bolt in FIG. 4 is replaced with a stud bolt different from that in FIG. 4.

The stud bolt 2 of the above embodiment is the second stud bolt 2B which has a predetermined bolt diameter (thread diameter) and includes the distal end portion 2*t* on which no thread is formed, but may be a first stud bolt having a thread formed up to a distal end thereof. For example, as shown in FIG. 7, if the first stud bolt having a thread formed up to a distal end thereof is a stud bolt 2A having a length that is short such that the stud bolt 2A is not inserted into the through hole 10*c* of the insertion far portion 10C, the stud bolt 2A has a structure in which oscillation on the distal end portion 2*t* side occurs with the insertion entrance portion 10H side as a fulcrum. However, the oscillation can be suppressed due to the presence of vibration suppression pieces 12 which are the same as in the above embodiment. That is, even in a fixing structure 100A in which the first stud bolt 2A is inserted and fixed to the stud bolt fixture 1, the oscillation of the stud bolt 2A can be suppressed.

Figure 8:
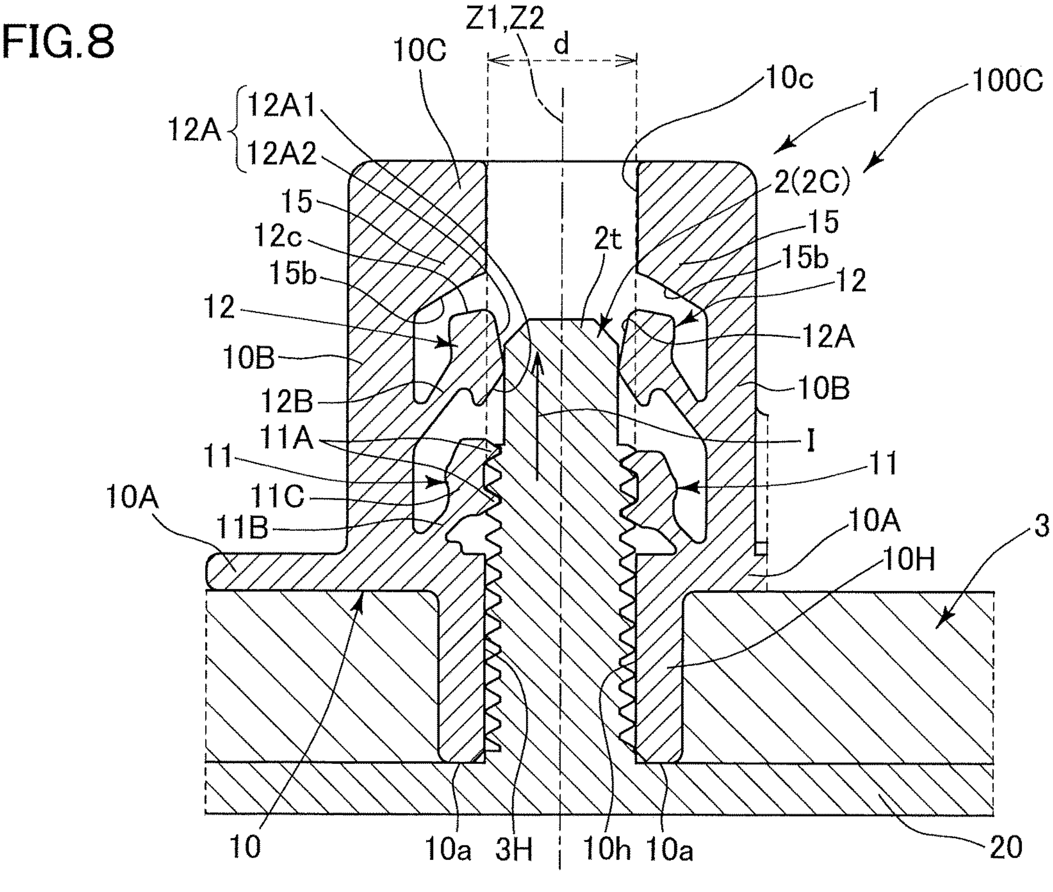
FIG. 8 is a cross-sectional view in which the stud bolt in FIG. 4 is replaced with a stud bolt different from those in FIG. 4 and FIG. 7.

If the stud bolt 2 is a second stud bolt including the distal end portion 2*t* having a cylindrical shape and having no thread formed thereon as in the stud bolt 2B of the above embodiment (see FIG. 4), but is a stud bolt 2C having a length that is short such that the distal end portion 2*t* is not inserted into the through hole 10*c*, for example, as shown in FIG. 8, the stud bolt 2C also has a structure in which oscillation on the distal end portion 2*t* side occurs with the insertion entrance portion 10H side as a fulcrum. However, the oscillation can also be suppressed due to the presence of vibration suppression pieces 12 which are the same as in the above embodiment (see FIG. 4). In this case, the pressing surface 12A of each vibration suppression piece 12 presses the distal end portion 2*t* (non-threaded portion) of the stud bolt 2C, but, since the distal end portion 2*t* has no thread, displacement, due to elastic deformation, of the vibration suppression piece 12 from the inner peripheral side toward the outer peripheral side is smaller than that of the stud bolt 2B of the above embodiment (see FIG. 4). However, since the inner-peripheral-side distal end surface 12*p* of the pressing surface 12A of the vibration suppression piece 12 is located on the inner peripheral side with respect to the distal ends of the engagement claws 11A of the elastic engagement piece 11, the inner-peripheral-side distal end surface 12*p* reliably comes into contact with the distal end portion 2*t* having no thread and having a small diameter, so that the vibration suppression piece 12 reliably becomes elastically deformed when oscillation of the stud bolt 2C occurs, and the oscillation can be suppressed. That is, even in a fixing structure 100C in which the second stud bolt 2C is inserted and fixed to the stud bolt fixture 1, the oscillation of the stud bolt 2C can be suppressed.

Furthermore, in this case, if the position, of the inner-peripheral-side distal end surface 12*p*, closest to the inserted stud bolt 2C is located on the inner peripheral side with respect to the thread of the stud bolt 2C as compared to the distal ends of the engagement claws 11A of the elastic engagement piece 11, the vibration suppression piece 12 reliably becomes elastically deformed when the stud bolt 2C is inserted, and the above oscillation can be suppressed.

DESCRIPTION OF THE REFERENCE CHARACTERS

1 stud bolt fixture
10 body part
10H insertion entrance portion (entrance portion)
10A flange portion
10B insertion body portion
10C insertion far portion
10*b* inner wall surface
11 elastic engagement piece
11A engagement claw
11B elastic arm
12 vibration suppression piece
12A pressing surface
12B elastic arm
13 functional part
15 deformation restriction portion
2 stud bolt
I insertion direction
Z1 axis of body part, axis direction of body part
Z2 axis of stud bolt, axis direction of stud bolt

What is claimed is:

1. A stud bolt fixture to which a stud bolt having a predetermined bolt diameter is configured to be inserted and fixed, the stud bolt fixture comprising:

a body part formed as an insertion part for the stud bolt and formed such that an entrance portion thereof is configured to be close to a thread crest of the inserted stud bolt;

a plurality of elastically deformable elastic engagement pieces provided around an axis of the stud bolt so as to sandwich the stud bolt inserted into the body part, and each including an elastic arm projecting inwardly from an inner wall surface of the body part on a far side with respect to the entrance portion, and an engagement claw for engaging a thread of the stud bolt at a distal end thereof; and elastically deformable vibration suppression pieces provided at the same positions as the elastic engagement pieces around the axis of the stud bolt so as to sandwich the stud bolt inserted into the body part, and each including an elastic arm projecting inwardly from the inner wall surface on the far side with respect to the elastic engagement piece, and a pressing surface for pressing the thread of the stud bolt at a distal end thereof, wherein the pressing surface includes an inner-peripheral-side distal end surface located on an inner peripheral side of the body part with respect to the engagement claw, the body part includes a deformation restriction portion which comes into contact with the vibration suppression pieces to prevent further elastic deformation of the vibration suppression pieces toward the outer peripheral side when the vibration suppression pieces become elastically deformed toward the outer peripheral side, and the inner wall surface on the far side with respect to the entrance portion of the body part is formed as an inclined surface protruding toward the inner peripheral side as coming closer to the far side, on the far side with respect to the position where each vibration suppression piece and the inner wall surface are connected to each other, and in an insertion and fixation state where the stud bolt is configured to be inserted into the body part and engaged by the engagement claws, each vibration suppression piece is pushed out toward an outer peripheral side by the stud bolt to become elastically deformed such that each vibration suppression piece is displaced from the inner peripheral side toward the outer peripheral side to a greater extent than the elastic engagement piece, whereby the pressing surface presses the stud bolt toward the inner peripheral side more strongly than the elastic engagement piece, and it is configured such that, when each vibration suppression piece is displaced in an oscillating manner to a great extent toward the outer peripheral side, it can come into contact with the inclined surface.

2. The stud bolt fixture according to claim 1, wherein a distal end portion of each vibration suppression piece on which the pressing surface is formed includes, as seen in the axial direction of the inserted stud bolt, a first extension portion which is configured to come into contact with the thread of the stud bolt and extends tangentially to a contact point thereof, and a second extension portion which bends from one end side of the first extension portion and extends toward a stud bolt side, which is configured to come into contact with the thread of the stud bolt at a first extension portion-side wall surface on an extending distal end side thereof, and which is shorter than the first extension portion, and a distal end portion of each elastic engagement piece comprises: a first extension portion extending tangentially to the stud bolt and having engagement claws configured to enter a thread groove of the stud bolt; and a second extension portion, shorter than the first extension portion, that bends from one end side of the first extension portion to extend toward the stud bolt side and having engagement claws configured to enter the thread groove of the stud bolt, as seen in an axis direction of the inserted stud bolt, and as seen in the axis direction of the inserted stud bolt, around the axis of the inserted stud bolt, a second extension portion side, with respect to the first extension portion, of each vibration suppression piece on which the pressing surface is formed, is opposite to a second extension portion side, with respect to the first extension portion, of each elastic engagement piece on which the engagement claws are formed.

3. The stud bolt fixture according to claim 2, wherein the elastic engagement pieces and the vibration suppression pieces are provided in pairs, as seen in the axis direction of the stud bolt, the elastic engagement pieces and the vibration suppression pieces are each positioned symmetrically with respect to the axis of the stud bolt.

4. The stud bolt fixture according to claim 1, wherein the inclined surface is a flat surface inclined with respect to the axis not having protrusions, and a contact surface of each vibration suppression piece that comes into direct contact with the inclined surface is also formed as a flat surface not having protrusions, and is configured such that the contact surface makes surface contact with the inclined surface.

5. The stud bolt fixture according to claim 4, wherein the pressing surface includes an entrance-side inclined distal end surface which forms a slope gradually approaching the inserted stud bolt from the near side toward the far side in an insertion direction, and a far-side distal end surface which bends on the far side of the entrance-side inclined distal end surface and further extends toward the far side in the insertion direction, and the contact surface is connected to the far-side distal end surface and extends in a direction away from the axis so as to be almost orthogonal to the far-side distal end surface.

* * * * *